United States Patent
Diehl et al.

(10) Patent No.: US 11,583,971 B2
(45) Date of Patent: Feb. 21, 2023

(54) MACHINE FOR MACHINING WORKPIECES WITH OPTICAL QUALITY

(71) Applicant: Satisloh AG, Baar (CH)

(72) Inventors: Joachim Diehl, Giessen-Allendorf (DE); Alexander Hofmann, Pohlheim (DE); Steffen Moos, Wettenberg (DE)

(73) Assignee: Satisloh AG

(*) Notice: Subject to any disclaimer, the term of this patent is extended or adjusted under 35 U.S.C. 154(b) by 1012 days.

(21) Appl. No.: 16/307,701

(22) PCT Filed: Jun. 7, 2017

(86) PCT No.: PCT/EP2017/000660
§ 371 (c)(1),
(2) Date: Dec. 6, 2018

(87) PCT Pub. No.: WO2017/211452
PCT Pub. Date: Dec. 14, 2017

(65) Prior Publication Data
US 2019/0184515 A1 Jun. 20, 2019

(30) Foreign Application Priority Data

Jun. 7, 2016 (DE) .......................... 102016006791.8

(51) Int. Cl.
*B24B 13/06* (2006.01)
*B24B 27/00* (2006.01)
(Continued)

(52) U.S. Cl.
CPC .............. *B24B 13/06* (2013.01); *B23Q 1/625* (2013.01); *B24B 27/0061* (2013.01);
(Continued)

(58) Field of Classification Search
CPC ................ B24B 13/06; B24B 13/0031; B24B 13/0037; B24B 27/0061; B24B 27/0076;
(Continued)

(56) References Cited

U.S. PATENT DOCUMENTS

| | | | |
|---|---|---|---|
| 4,461,121 A * | 7/1984 | Motzer | B24B 3/065 451/5 |
| 5,402,607 A | 4/1995 | Lombard | |
| 6,155,911 A | 12/2000 | Mandler | |
| 6,681,655 B2 | 1/2004 | Rein | |

(Continued)

FOREIGN PATENT DOCUMENTS

| | | |
|---|---|---|
| CN | 1857852 A | 11/2006 |
| CN | 2917940 Y | 7/2007 |

(Continued)

OTHER PUBLICATIONS

Chinese Office Action for Chinese Application No. 201780034055.6 dated Apr. 9, 2020 (8 pages).
English Translation of Chinese Office Action for Chinese Application No. 201780034055.6 dated Apr. 9, 2020 (5 pages).
(Continued)

*Primary Examiner* — Joel D Crandall
*Assistant Examiner* — Makena S Markman
(74) *Attorney, Agent, or Firm* — Reising Ethington P.C.

(57) ABSTRACT

A machine (10) for machining workpieces with optical quality has at least one workpiece spindle (12), which rotatably drives a workpiece (L) to be machines about a workpiece axis of rotation (C). A swivel head (14) located opposite the workpiece spindle, is pivotable about a pivot axis (B), and bears at least two tool spindles (16, 18), each of which rotatably driving at least one machining tool (T1, T2, T3) about a tool axis of rotation (D, D'). The workpiece spindle and the swivel head (14) are adjustable relative to one another along three mutually perpendicular linear axes
(Continued)

(X, Y, Z). One axis (Y) extends parallel to the pivot axis (B). Another axis (Z) extends parallel to the axis (C) of workpiece rotation. At least one tool spindle is attached to the swivel head with its tool axis of rotation (D') extending parallel to the pivot axis (B).

27 Claims, 12 Drawing Sheets

(51) Int. Cl.
  *B24B 41/04* (2006.01)
  *B24B 47/12* (2006.01)
  *B23Q 1/62* (2006.01)
  *B23Q 39/00* (2006.01)

(52) U.S. Cl.
  CPC .............. *B24B 41/04* (2013.01); *B24B 47/12* (2013.01); *B23Q 2039/004* (2013.01)

(58) Field of Classification Search
  CPC ................ B24B 27/0084; B24B 41/04; B24B 41/007; B24B 41/042; B24B 47/12; B24B 47/22; B24B 47/225; B24B 9/14; B24B 9/146; B24B 9/148; B23Q 1/625; B23Q 2039/004
  See application file for complete search history.

(56) References Cited

U.S. PATENT DOCUMENTS

| | | | |
|---|---|---|---|
| 6,712,671 B2 | 3/2004 | Wallendorf et al. | |
| 7,455,569 B2 | 11/2008 | Schäfer et al. | |
| 7,739,778 B2 | 6/2010 | Fiedler et al. | |
| 7,874,895 B1* | 1/2011 | Toycen | B24B 3/26 |
| | | | 451/11 |
| 9,278,421 B2 | 3/2016 | Diehl et al. | |
| 9,321,145 B2* | 4/2016 | Wallendorf | B24B 13/00 |
| 9,427,844 B2* | 8/2016 | Diehl | B24B 13/0055 |
| 2007/0293128 A1* | 12/2007 | Schafer | B24B 13/0037 |
| | | | 451/7 |
| 2008/0051015 A1* | 2/2008 | Schneider | B24B 27/0061 |
| | | | 451/67 |

FOREIGN PATENT DOCUMENTS

| | | |
|---|---|---|
| CN | 201235485 Y | 5/2009 |
| CN | 202271260 U | 6/2012 |

OTHER PUBLICATIONS

German Office Action; Applicant: Satisloh AG; Application No. 102016006791.8; dated Apr. 28, 2017; 5 pages.

International Search Report; Applicant: Satisloh AG; Application No. PCT/EP2017/000660; Filing Date; Jun. 7, 2017 dated Sep. 4, 2017; 14 Pages.

* cited by examiner

MACHINE FOR MACHINING WORKPIECES WITH OPTICAL QUALITY

TECHNICAL FIELD

The present invention relates generally to a machine for processing workpieces in optical quality. In particular, the invention relates to a machine for grinding and/or polishing such as used in, for example, the precision optical industry on a large scale in lens, mirror and mold production.

PRIOR ART

The processing of workpieces in optical quality by material removal can be roughly divided into two processing phases, namely initially the preliminary processing of the optically effective surface for generation of the desired macrogeometry (or topography) and then precision processing of the optically effective surface in order to eliminate preliminary processing tracks and obtain the desired microgeometry. Whereas preliminary processing of the optically effective surfaces for imparting shape is carried out, inter alia, in dependence on the material of the workpieces by grinding (for example in the case of lenses of mineral glass), milling (for example in the case of metallic mold inserts) and/or turning (for example in the case of plastics material lenses), the optically effective surfaces of workpieces in precision processing for achieving the desired surface roughness are usually subject to a precision-grinding, lapping and/or polishing process. Insofar as the term "processing", also in word combinations such as, for example, "processing tool" or the like, is used in the terminology of the present application this shall embrace material-removing preliminary and precision processing, primarily with a geometrically undefined cutter and incorporated grain (grinding) or loose grain (polishing).

Currently, one machine or in a given case several machines with a large number of precisely running tools is or are required for carrying out more complex processing sequences. Since the change from one machine to a downstream machine requires time and, due in part to different clamping systems for workpiece mounting, also involves the risk of rechucking errors, machines equipped with several processing spindles have already been proposed in the prior art.

Thus, document U.S. Pat. No. 6,155,911 discloses a device for polishing optical lenses on both sides, in which a pivot head is present at a machine frame in the upper part. The pivot head is pivotable about a pivot axis and carries a tool spindle for an upper shaping tool for processing a convex lens surface as well as a "multi-purpose spindle" for an upper "multi-purpose tool", which comprises an inner dressing tool and an outer tool mount. Arranged in the lower part of the machine frame is a horizontally movable X slide connected with a vertically movable Z slide, which in turn carries an additional tool spindle for a lower shaping tool for processing a concave lens surface as well as a further "multi-purpose spindle" for a lower "multi-purpose tool". The latter similarly has an inwardly disposed dressing tool and an outwardly disposed tool mount.

With this device (a) the two shaping tools can be dressed with the respectively opposite dressing tool of the corresponding "multi-purpose tool", (b) a lens initially held in the workpiece mount of the lower "multi-purpose tool" can be processed at its convex lens surface by the upper shaping tool, (c) the lenses can be transferred from the workpiece mount of the lower "multi-purpose tool" to the workpiece mount of the upper "multi-purpose tool" and, finally, (d) the lenses then held in the workpiece mount of the upper "multi-purpose tool" can be processed by the lower shaping tool at the concave lens surface thereof. However, a disadvantage of this device is to be seen in the fact that particularly as a consequence of the physical proximity of the spindles of the respective spindle pair at the pivot head or at the Z slide and the length of the spindles mounted on the pivot head it is significantly limited not only with respect to the processible workpiece geometries, but also with respect to the size of the workpieces to be processed.

A grinding and polishing machine which is significantly more flexible by comparison with this prior art, for grinding and/or polishing workpieces in optical quality, is known from document U.S. Pat. No. 7,455,569 which is hereby incorporated by reference. This machine comprises, in a very compact mode of construction, two workpiece spindles, which rotatably drive a respective workpiece to be processed about a workpiece axis of rotation, and a pivot head which is opposite the workpiece spindles and pivotable about a pivot axis. The pivot head carries two parallel arranged tool spindles, each of which is constructed at the two ends for coaxial mounting of a respective processing tool and can be driven for rotation about a respective tool axis of rotation extending transversely to the pivot axis. The workpiece spindles and the pivot head are, in addition, adjustable relative to one another along three mutually perpendicular linear axes, of which one linear axis (Y) extends parallel to the pivot axis, whereas another linear axis (Z) extends parallel to the workpiece axes of rotation.

In this prior art it is possible in advantageous manner for the tool spindles to be rotated by way of the pivot head with respect to the workpiece spindles not only statically, but also dynamically in any defined angular positions between 0° and 360°, in which case, for example, a tool change can be carried out by pivoting of the pivot head through approximately 180° about the pivot axis so that a downstream processing step is made possible at one and the same workpiece surface. Moreover, due to the linear axis (Y), which is additional by comparison with the prior art outlined in the introduction and which extends parallel to the pivot axis, further workpiece geometries can be processed, which is of advantage particularly in view of the circumstance that in the precision optical industry a stronger trend towards more complex components, in particular with aspherical surfaces and free-shape surfaces, can be observed.

However, the processing possibilities in the prior art defining the category reach their limits when very large workpieces or workpieces with large changes in topography have to be processed. Due to the constructional form of the tool spindles and the necessity of a stiff spindle mounting there arise at the pivot head, in particular, disruptive contours which in the past have prevented processing of such workpieces, otherwise there is the risk of damage of machine and/or workpiece as a consequence of unintended collisions between spindle housing and workpiece.

What is desired is a machine, which is constructed as compactly as possible, for processing workpieces in optical quality, which machine is usable as universally as possible and thus allows different processing strategies, especially even the processing of large workpieces or workpieces with large changes in topography and with a high level of accuracy.

SUMMARY OF THE INVENTION

According to one aspect of the invention, in a machine for processing workpieces in optical quality—which machine has at least one workpiece spindle, which rotatably drives a workpiece to be processed about an axis C of workpiece rotation, and a pivot head which is opposite the workpiece spindle and which is pivotable about a pivot axis B and carries at least two tool spindles, each of which rotatably drives at least one processing tool about an axis D, D' of tool rotation, wherein the workpiece spindle and the pivot head are in addition adjustable relative to one another along three mutually perpendicular linear axes X, Y, Z, of which one linear axis Y extends parallel to the pivot axis B, whereas another linear axis Z extends parallel to the workpiece rotational axis C—at least one tool spindle is mounted on the pivot head with its tool rotational axis D' extending parallel to the pivot axis B.

Through the rotationally parallel arrangement of tool spindle and pivot head it is possible to displace an engagement region at the circumference of the processing tool held at this tool spindle by motion about the pivot axis B. The engagement region of the processing tool can be brought into processing engagement with a workpiece which is held at the workpiece spindle and is to be processed. In particular, the engagement region can be displaced relative to the pivot axis B of the pivot head and the other tool spindle at the pivot head in a processing plane, which is aligned with the third linear axis X, radially outwardly transversely to the pivot axis B, facing away from the other tool spindle. In this way, a very compact pivot head and tool spindle combination results which makes possible a "circular locus" of the processing tools of maximum size without an individual large three-dimensional extent during the processing. As a consequence thereof, even very large workpieces or workpieces with large changes in topography and/or pronounced inclinations can be processed without problems with lengthy travel paths along the linear axis X and/or large pivot angles about the pivot axis B, without the risk of collisions between the pivot head or the tool spindles mounted thereon and the workpiece.

Both grinding tools and polishing tools can be used as processing tools at the tool spindle arranged parallel with respect to the pivot axis B. These tools can be spherical or also have only an engagement region, which has the shape of the segment of a sphere or a section of a sphere, with respect to the workpiece, or can be discoid. In the case of use of, for example, a circumferential grinding wheel a separate edge processing is possible, so that in downstream processing procedures the workpieces can be oriented more easily and precisely, which is important particularly for measurement tasks. With the assistance of this tool spindle and suitable processing tools it is also possible for facets to be machined at the workpieces and, in particular, not only at round workpieces, but also at workpieces with any edge geometry, since the risk of unintended collision with other processing tools or spindle components is minimized.

According to one aspect of the invention, it become possible, with low constructional outlay, to bring the most diverse processing tools into engagement, with precise running, with the respective workpiece to be processed, so that a large number of more complex surfaces and components can be processed largely with avoidance of special tools. In particular, all common grinding and polishing methods can be carried out, including rotary circumferential transverse and length processing, external cylindrical grinding and polishing, cup grinding and face grinding and polishing. In the case of use of particularly narrow grinding wheels there is in addition a possibility of sawing or separating so that, for example, prisms can also be produced.

For preference, the arrangement of tool spindles at the pivot head is such that the engagement region of at least one of the processing tools mounted thereon, which can brought into processing engagement with the workpiece, defines a radially outer circular locus of the pivot head about the pivot axis B, i.e. a circular locus beyond which no other processing tool or spindle part projects. Thus, it is advantageously possible to rapidly change from this processing tool, through a pure pivot movement of the pivot head about the pivot axis B, to a different processing tool without a linear travel plan or linear deflection movements being necessary for that purpose.

According to one embodiment of the invention, the engagement regions of all processing tools can have substantially the same radial spacing from the pivot axis B. Thus, through pivoting of the pivot head about the pivot axis B a change between any processing tools at the pivot head is possible; larger linear movements are not needed for that purpose, as a result of which processing downtimes are minimized.

Moreover, the arrangement can be such that the engagement regions of the processing tools are substantially uniformly angularly spaced from one another with respect to the pivot axis B. This advantageously ensures a minimum of disruptive contours at the pivot head. The individual processing tools can be pivoted to an equal extent about the pivot axis B, which in turn is of advantage with respect to the processing of large workpieces and/or surfaces with large differences in height.

Moreover, preferably at least one additional tool spindle is mounted on the pivot head with its tool rotational axis D extending transversely to the pivot axis B, whereby the use of, for example, cup tools is possible. This is conducive to a largest possible multiplicity of processing procedures and strategies. In that regard, the tool spindle can in principle be constructed at merely one end for mounting a processing tool. However, by contrast a design is preferred in which the tool spindle with the tool rotational axis D extending transversely to the pivot axis B is constructed at both ends for coaxial mounting of a respective processing tool. Thus, two processing tools can be driven in a space-saving and economic manner by a single drive. If, for example, a spherical or discoid grinding tool is used at the tool spindle with the tool rotational axis D' extending parallel to the pivot axis B, whereas the tool spindle with the tool rotational axis D extending transversely to the pivot axis is equipped at both ends with cup tools, several successive processing steps are advantageously possible in one workpiece chucking. Thus, for example, preliminary grinding by the first cup tool, precision grinding by the second cup tool and finally ultra-precision processing by the spherical or discoid tool rotating parallel to the pivot axis B, whereby overall a high level of surface trueness and at the same time an increase in individual tool service lives and thus also a higher level of machine serviceability and productivity are the result.

For preference, a center of mass of the pivot head carrying the tool spindles lies on or at least close to the pivot axis B, thus in the immediate vicinity thereof. This has the advantage that for pivoting of the pivot head about the pivot axis B only a small amount of drive power is needed. In addition, eccentricities at the pivot head which can be detrimental to high processing accuracy are avoided. Processing procedures which during engagement of the processing tool with the workpiece require pivoting of the pivot head about the pivot axis B can advantageously be executed in highly dynamic manner.

For rotary drive of the tool spindle with the tool rotational axis D' extending parallel to the pivot axis B various drive concepts of short construction are possible, for example a chain drive or a drive by way of a gearwheel transmission. However, in order to achieve high rotational speeds with low wear and substantial running quietness it is preferred for rotational drive of the tool spindle with the tool rotational axis D' extending parallel to the pivot axis B to have a belt drive with a spindle motor which is arranged parallel to the spindle shaft and which is in drive connection with the spindle shaft by way of a belt.

In principle, it is conceivable to provide in this case a tensioning roller between the spindle motor and spindle shaft for tensioning the belt. However, with respect to a lowest possible outlay and a very compact form of construction it is preferred if the spindle motor is mounted to be pivotable relative to the spindle shaft for tensioning the belt.

For preference the belt of such a belt drive is a poly-V-belt that offers a high level of force transmission in little space with a highest degree of stability as well as running quietness even in the case of high drive speeds.

In principle, a ball spindle drive or the like can be used for adjustment of the workpiece spindle along the linear axis Z. However, it is preferred to mount the workpiece spindle for adjustment along the linear axis Z on a Z slide which is guided by way of a guide arrangement at a machine bed and which is moved by use of a linear motor relative to the machine bed. The use of a linear motor for axial movement of the workpiece spindle is not only advantageous to the extent that readjustment without a reversing spindle can be carried out more dynamically and accurately, but particularly also because a power-regulated grinding process can be carried out such as described in document U.S. Pat. No. 9,278,421, which is hereby incorporated by reference. For such a process, in which the linear motor predetermines a variable feed power by way of the motor current, instantaneous power relationships are inferred on the basis of target and actual directions of feed movement and as a result thereof the feed power is influenced by way of motor current in process-dependent manner, the material removal performance during grinding, in particular, is optimized. The result is in advantageous manner significant reductions in processing times, elimination of safety spacings, simple initial cut recognition and more reliable prevention of overload states of workpiece and tool due to high feed speeds or due to collisions.

Moreover, the guide arrangement for the Z slide can be equipped with clamping elements by way of which the Z slide is fixable relative to the machine bed. It is possible through measures of that kind to avoid undesired sinking of the Z slide in the case of emergency shutdown or servo-off (shutdown of drives) of the machine. Moreover, the linear axis Z can be established more favorably in terms of energy for specific processing procedures such as, for example, separating processes, also in order to increase the stiffness during processing.

For preference, the machine is additionally provided with a device for weight compensation for the Z slide carrying the workpiece spindle. As a result, processing procedures can advantageously be operated in a particularly highly dynamic manner without the risk of "overshooting", which is caused by gravitational force, in the movement along the linear axis Z. In principle, it is conceivable to use, as a device for weight compensation, a counterweight which by way of a deflecting and braking mechanism supports the Z slide with the workpiece spindle mounted thereon. However, with respect to a compact design, rapid reaction times and good controllability it is preferred if the device for weight compensation comprises at least one pneumatic cylinder which is arranged between the Z slide and the machine bed and can be acted on pneumatically in order to counter the weight of the Z slide carrying the workpiece spindle. This makes possible a highly sensitive setting of the position of the Z slide by use of the linear motor and additionally assists the above-discussed power-regulated grinding process with the help of the linear motor.

Finally, in a further, preferred development step the pivot head can be provided with a functional element for detecting the workpiece geometry. In that regard it can be, for example, a scanner or a ring spherometer according to DIN 58724, which is mounted laterally at the outside on the pivot head or one of the housing of the tool spindles. In this way it is possible, without additional movement axes, to carry out measurements of the workpiece geometry directly before, during or after different grinding steps in situ and automatically take into consideration possibly required corrections by the CNC control. It is possible through the pivotability, which is given by way of the pivot head, of the scanner or the spherometer about the pivot axis B to place the respective functional element aligned to normal on any desired point of the workpiece, whereby—not least—erroneous measurements due to oblique scanning are avoided.

BRIEF DESCRIPTION OF THE DRAWINGS

The invention is explained in more detail in the following on the basis of preferred embodiments with reference to the accompanying partly simplified or schematic drawings, which are not true to scale, wherein the same or corresponding parts are provided with the same reference numerals. In the drawings.

DETAILED DESCRIPTION OF THE EMBODIMENTS

Figure 1:
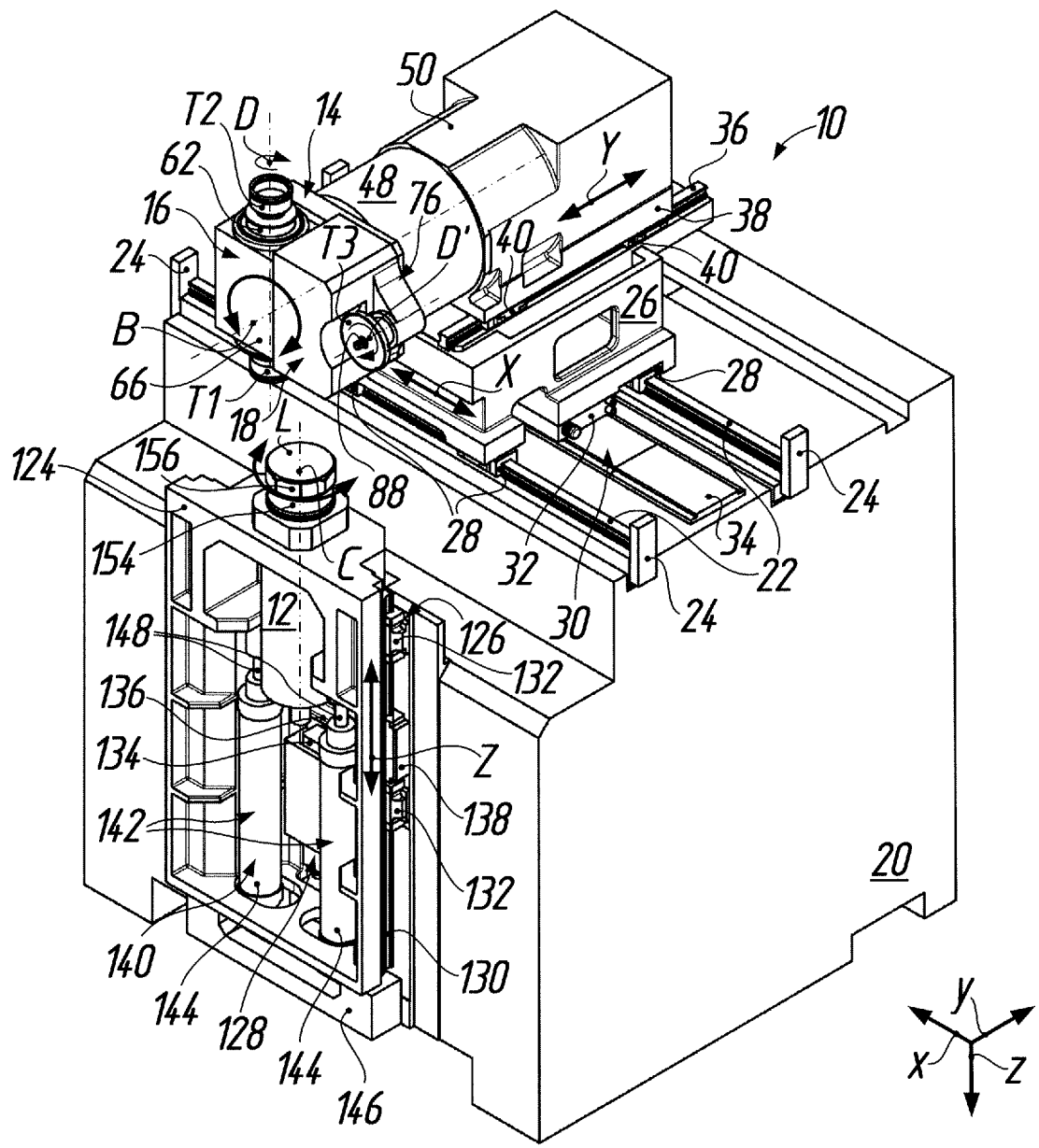
FIG. 1 shows a perspective view of a grinding and polishing machine for precision processing of workpieces in optical quality, obliquely from above and front right, with a lower workpiece spindle, which is vertically adjustable by way of a Z slide, and an upper pivot head according to a first embodiment, which is adjustable in a horizontal plane by way of an X/Y cross-table arrangement and which is pivotable about a horizontally extending pivot axis B and carries two tool spindles, the tool rotational axes D, D' of which have different orientation, wherein to allow a view of essential components or subassemblies of the machine and to simplify the illustration of, in particular, the operating unit and control, cladding components, door mechanisms and panes, deposits for workpieces and tools, the supply devices (including lines, hoses and pipes) for electric current, compressed air and polishing medium, the polishing medium return and the machine-internal measuring, servicing and safety devices, have been omitted.

FIGS. 1 to 4 show a CNC-regulated grinding and polishing machine 10 for processing workpieces L, particularly lenses, in optical quality in a right-angled Cartesian co-ordinate system, in which the letter x denotes the width direction, the letter y the length direction and letter z the height direction of the machine 10. In the illustrated embodiment the machine 10 generally comprises a workpiece spindle 12, by way of which the workpiece L to be processed is drivable for rotation about a workpiece rotational axis C, and a pivot head 14, which is opposite the workpiece spindle 12 and is pivotable about a pivot axis B and which here carries two tool spindles 16, 18, at each of which at least one precision processing tool (cup wheels T1, T2; circumferential grinding wheel T3) is held to be drivable for rotation about a tool rotational axis D or D'. As will also be described in more detail, the workpiece spindle 12 and the pivot head 14 are additionally adjustable relative to one another along three mutually perpendicular linear axes X, Y, Z, of which one linear axis Y extends parallel to the pivot axis B, whereas another linear axis Z extends parallel to the workpiece rotational axis C. It is significant that at least one (18) of the tool spindles is mounted on the pivot head 14 with its tool rotational axis D' extending parallel to the pivot axis B, whereby a multiplicity of processing possibilities particularly for large workpieces L results, as will similarly be explained in detail in the following.

The machine 10 comprises a machine bed 20, which is formed from a monolithic block of a mineral casting ("polymer concrete"). Two guide rails 22 extending parallel to one another in the horizontal width direction x are secured to the machine bed 20 on the upper side of the machine 10. The two guide rails 22 are bounded by end abutments 24. An X slide 26 is guided by way of guide carriages 28 on guide rails 22 to be displaceable and is adjustable under CNC positional regulation in both directions of the linear axis X by a linear motor 30. The current-conducting primary part 32 of the linear motor 30 is attached under the X slide 26, whereas the passive secondary part 34 is arranged between the guide rails 22 at the machine bed 20.

Figure 2:
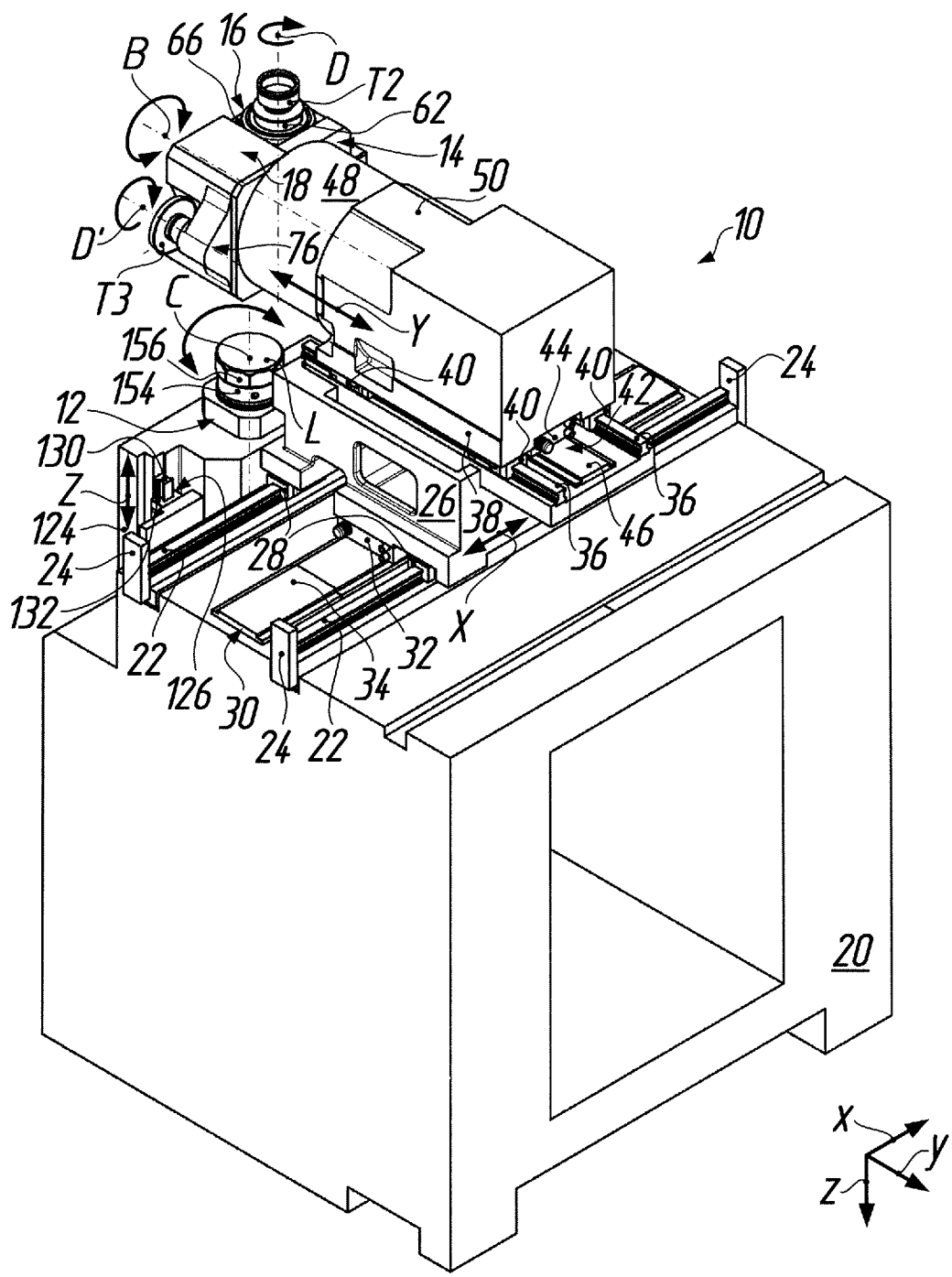
FIG. 2 shows a perspective view of the grinding and polishing machine according to FIG. 1 obliquely from above and rear left, with the simplifications of FIG. 1.

Two guide rails 36 extending parallel to one another in the horizontal length direction y are attached to the X slide 26, as can be best seen in FIG. 2. A Y slide 38 is guided by way of guide carriages 40 on the guide rails 36 to be displaceable and is adjustable under CNC positional regulation in both directions of the linear axis Y by a further linear motor 42. The further linear motor 42 has a current-conducting primary part 44 which is mounted underneath on the Y slide 38 and co-operates with a passive secondary part 46 mounted on the X slide 26 between the guide rails 36.

The Y slide 38 carries a pivot drive 48 which pivots the pivot head 14 about the pivot axis B under CNC rotational angle regulation, thus with a defined angular position. It will be apparent that the slides 26, 38 thus form an X/Y cross-table arrangement, which adjusts the pivot head 14 in a horizontal plane in which the pivot axis B lies. The tool spindles 16, 18 are mounted at the pivot head 14 in an arrangement adjacent to one another so that the tool spindle 16 extends by its tool rotation axis D transversely to the pivot axis B, whereas the tool rotational axis D' of the tool spindle 18 extends along the pivot axis B. The arrangement is in that case such that a center of mass of the pivot head 14 carrying the tool spindles 16, 18 lies on or at least close to the pivot axis B.

Figure 5:
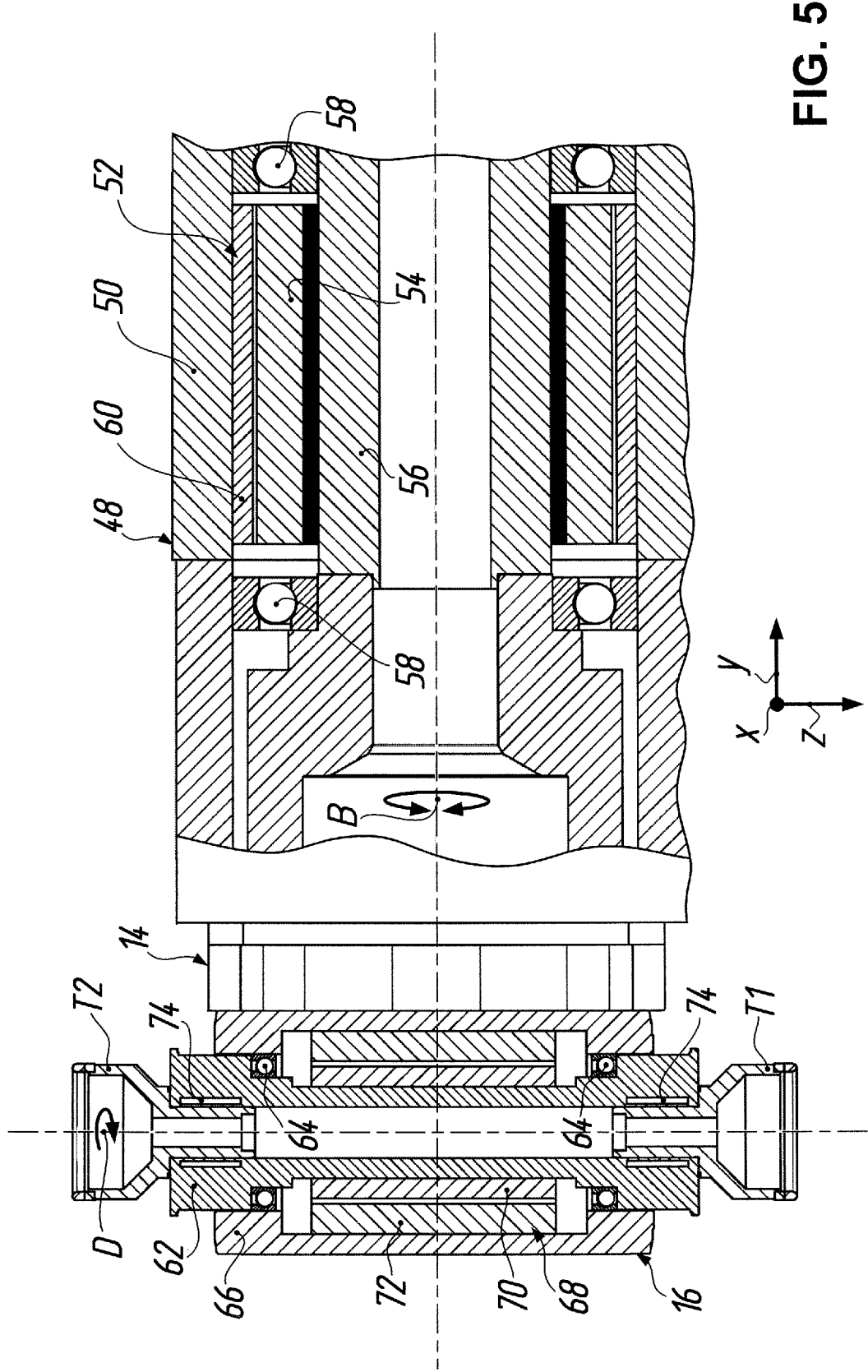
FIG. 5 shows an illustration, which is to enlarged scale and partly broken away, of the detail V in FIG. 4, with the first tool spindle, which is shown broken away along the tool rotational axis D extending transversely to the pivot axis B, of the grinding and polishing machine on the lefthand side and the pivot head, which is illustrated broken away along the pivot axis B, of the grinding and polishing machine on the righthand side, wherein the respective drive and mounting situation is shown substantially simplified, i.e. schematically.

Further details with respect to the pivot drive 48 can be inferred from FIG. 5. The pivot drive 48 comprises a torque motor 52, which is arranged coaxially with the pivot axis B in a multi-part drive housing 50 and the rotor 54 of which is mounted on a pivot shaft 56, which in turn is fixedly connected with the pivot head 14 (for example by screws, which are not illustrated here). The composite of pivot head 14 and pivot shaft 56 is mounted in the drive housing 50 by way of two mutually spaced bearings 58 to be rotatable and axially non-displaceable. The stator 60 arranged concentrically with respect to the rotor 54 of the torque motor 52 is attached to the drive housing 50 to be secure against relative rotation.

Further details of the tool spindle 16 can be inferred from FIG. 5. According to that, the tool spindle 16 is formed at both ends for coaxial mounting of a respective processing tool (cup wheels T1, T2). More precisely, the tool spindle 16 has a continuous spindle shaft 16 which is formed as a hollow shaft and which is mounted in a spindle housing 66 by way of two mutually spaced bearings 64 to be rotatable and axially non-displaceable. In addition, a torque motor 68 for speed-controlled drive of the spindle shaft 62 about the tool rotational axis D is mounted in the spindle housing 66, the rotor 70 of the motor being fixedly connected with the spindle shaft 62, whereas the stator 72, which concentrically surrounds the rotor 70, of the torque motor 68 is attached to the spindle housing 66 to be secure against relative rotation. Hydraulic expansion chucks 74 are provided at both ends of the spindle shaft 62 so as to clamp in place the shanks of the tools T1 and T2 inserted into the hollow spindle shaft 62.

Figure 6:
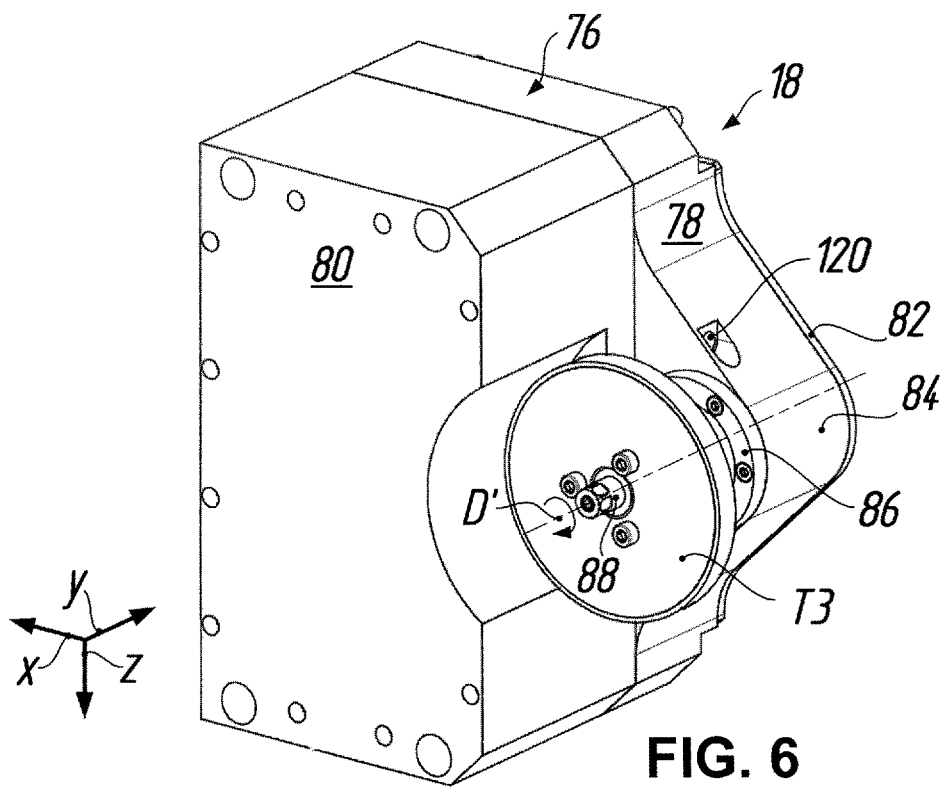
FIG. 6 shows a perspective view of the second tool spindle, which is removed from the pivot head, of the grinding and polishing machine according to FIG. 1 obliquely from above and front right, with a tool held thereat.
Figure 7:
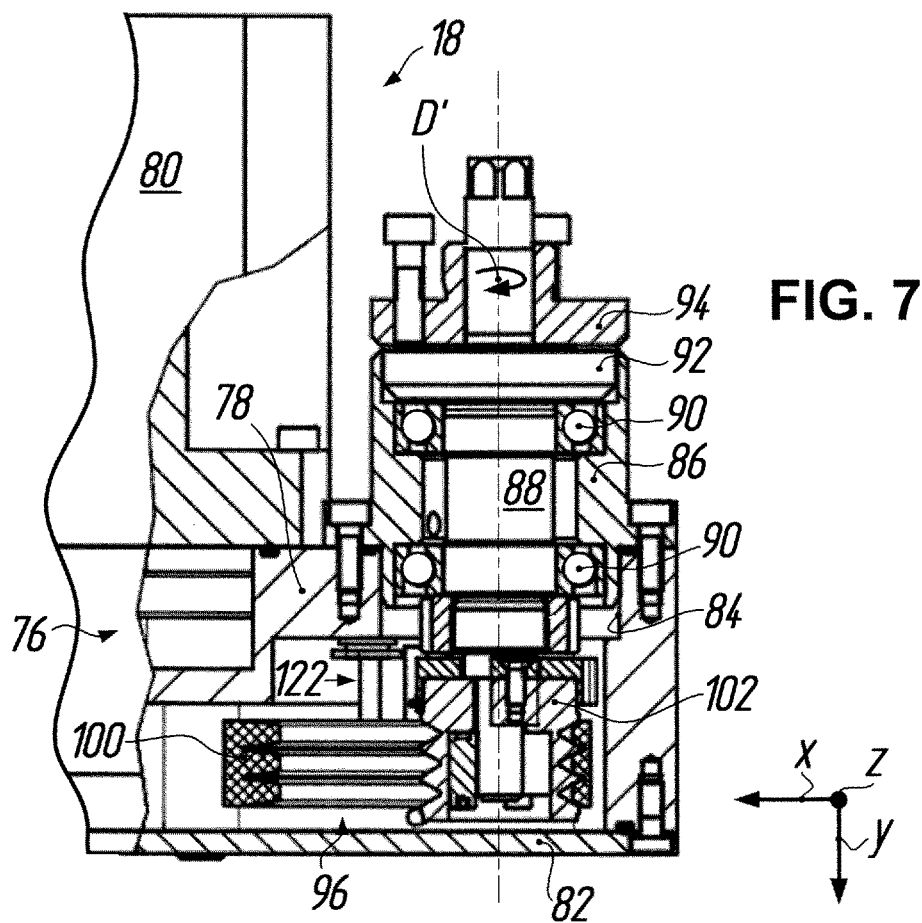
FIG. 7 shows a partly broken-away lower view of the second tool spindle of the grinding and polishing machine according to FIG. 1 from below in FIG. 6, without a tool, wherein the second tool spindle is shown with its spindle housing broken away along the tool rotational axis D' extending parallel to the pivot axis B.

Details with respect to the second tool spindle 18 mounted on the pivot head 14 near the afore-described first tool spindle 16 can be inferred from FIGS. 6 to 9. According to those, the tool spindle 18 comprises a multi-part spindle housing 76, comprising a center base 78 as well as a front cover 80 and a rear cover 82, which are attached to the base 78 by screw connections, as indicated in FIG. 7. The base 78 forms a laterally projecting bearing eye 84 which flange-mounts a mounting flange 86. According to FIG. 7, a spindle shaft 88 is mounted in the mounting flange 86 by way of two mutually spaced angular contact ball bearings 90 to be rotatable and axially non-displaceable. The spindle shaft 88 is provided at its end projecting outwardly beyond the bearing flange 86 with a clamping dome 92, which attaches to a tool adapter 94 to be secure against relative rotation. The circumferential grinding wheel T3 shown in FIG. 6 is securable, as processing tool, to the tool adapter 94 in a manner known per se by use of screws to be centered with respect to the spindle shaft 88. In correspondence with the respective processing requirements, the latter can have a cylindrical outer circumferential surface or, however, an outer circumferential surface in the form of a symmetrical spherical zone (spherical-annular grinding wheel).

Figure 9:
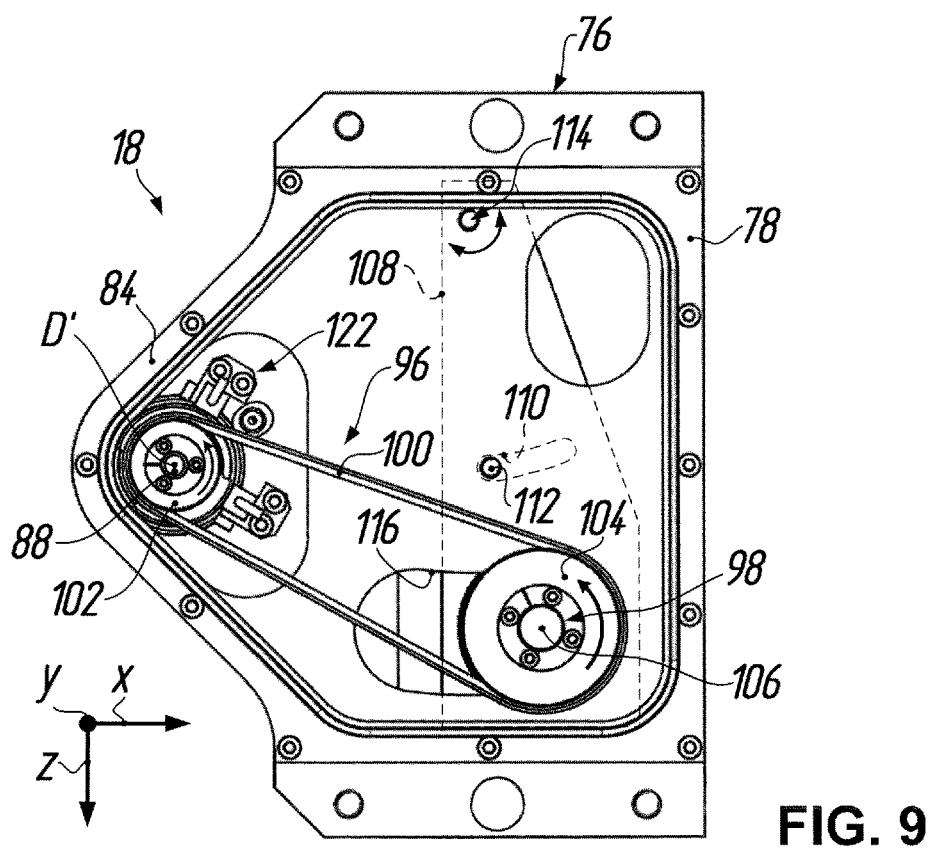
FIG. 9 shows a rear view of the second tool spindle of the grinding and polishing machine according to FIG. 1 from the back in FIG. 6, without a tool, wherein a rear cover of the spindle housing has been removed so as to allow a view of a belt drive of the second tool spindle.

As can be inferred from, in particular, FIGS. 7 and 9 a belt drive 96 with a spindle motor 98 which is arranged parallel to the spindle shaft 88 and which is in driving connection with the spindle shaft 88 by way of a belt 100 is provided for rotational drive of the tool spindle 18 with the tool rotational axis D' extending parallel to the pivot axis B. More precisely, a belt pulley 102 on which the belt 100 runs is secured to the end of the spindle shaft 88 projecting beyond the bearing flange 86 in the base 78 of the spindle housing 76, the belt 100 also running on a belt pulley 104 mounted on a motor shaft 106, which projects into the base 78 of the spindle housing 76, of the spindle motor 98 (see FIG. 9). The belt 100 in the illustrated embodiment is a poly-V belt such as commercially available, for example, under the designation "Polyflex [Registered Trade Mark] JB [Trade Mark] V-belt" from Walther Flender Group, Dusseldorf, Germany.

Figure 8:
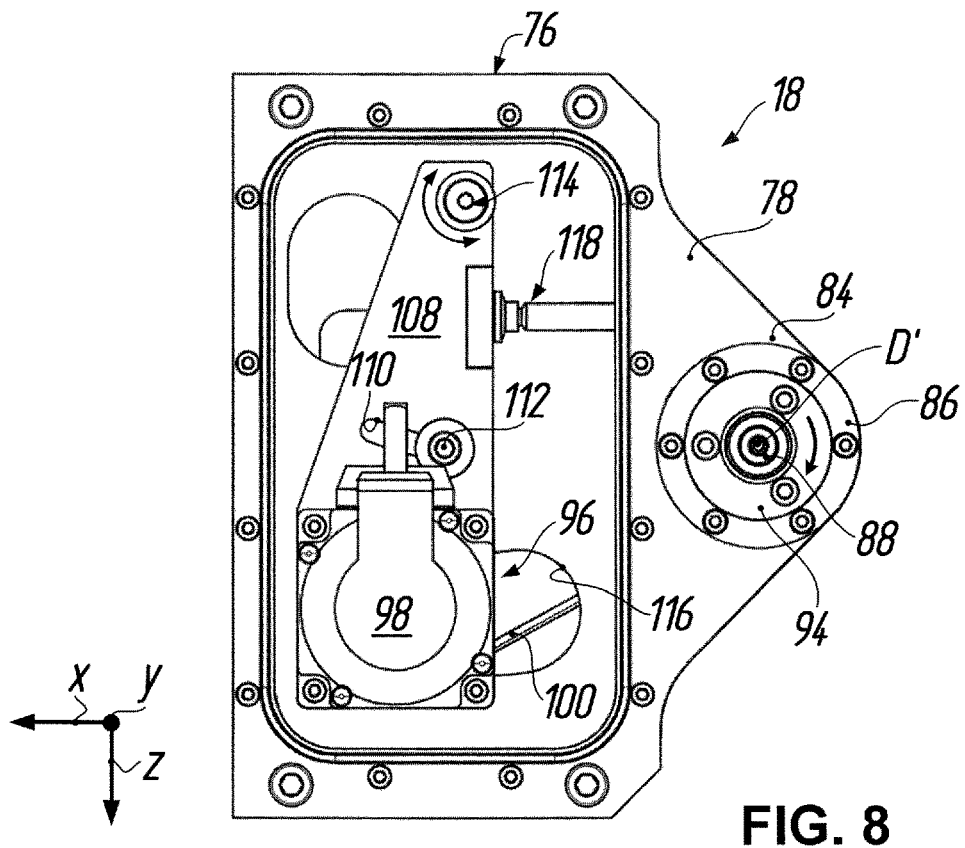
FIG. 8 shows a front view of the second tool spindle of the grinding and polishing machine according to FIG. 1 from the front in FIG. 6, without a tool, wherein a front cover of the spindle housing has been removed so as to allow a view of a spindle motor of the second tool spindle.

According to FIGS. 8 and 9, the spindle motor 98 is mounted to be pivotable relative to the spindle shaft 88 for tensioning the belt 100. For that purpose, the spindle motor 98 is flange-mounted below the cover 80 on a plate-shaped clamping flange 108 arranged on the side of the base 78 remote from the cover 82. The clamping flange 108 is mounted to be pivotable, guided by way of a curved slot 110 and a fitting screw 112 secured to the base 78, with respect to the base 78 about a bearing point 114 at the base 78, as indicated in FIGS. 8 and 9 by a double arrow. In that case, the motor shaft 106 passes through a cut-out 116 in the base 78 so that the belt pulley 104 and the clamping flange 108 are arranged on opposite sides of the base 78. According to FIG. 8, a joint member 118 laterally engages the clamping flange 108 between the motor shaft 106 and the bearing point 114. The joint member 118 is axially adjustable relative to the base 78 by way of a handle, which is indicated in FIG. 6 at 120 and accessible at the spindle housing 76 from outside, and a threaded connection (not shown) with respect to the base 78 along its longitudinal axis. It will be evident that through axial adjustment of the joint member 118 the clamping flange 108 is pivotable about the bearing point 114, whereby the belt 100 can be tensioned.

Finally, a sensor arrangement which, for sensing the rotational speed of the spindle shaft 88 is fastened to the base 78, is indicated in FIG. 9 at 122.

As can be further inferred from FIGS. 1 to 4, the workpiece spindle 12 for adjustment along the linear axis Z is mounted on a Z slide 124, which is guided by a guide arrangement 126 at the machine bed 20 and is movable relative to the machine bed 20 by a further linear motor 128. In order to be able to better recognize the details with respect thereto the tool spindle 12 was omitted in the illustration according to FIG. 10.

Figure 10:
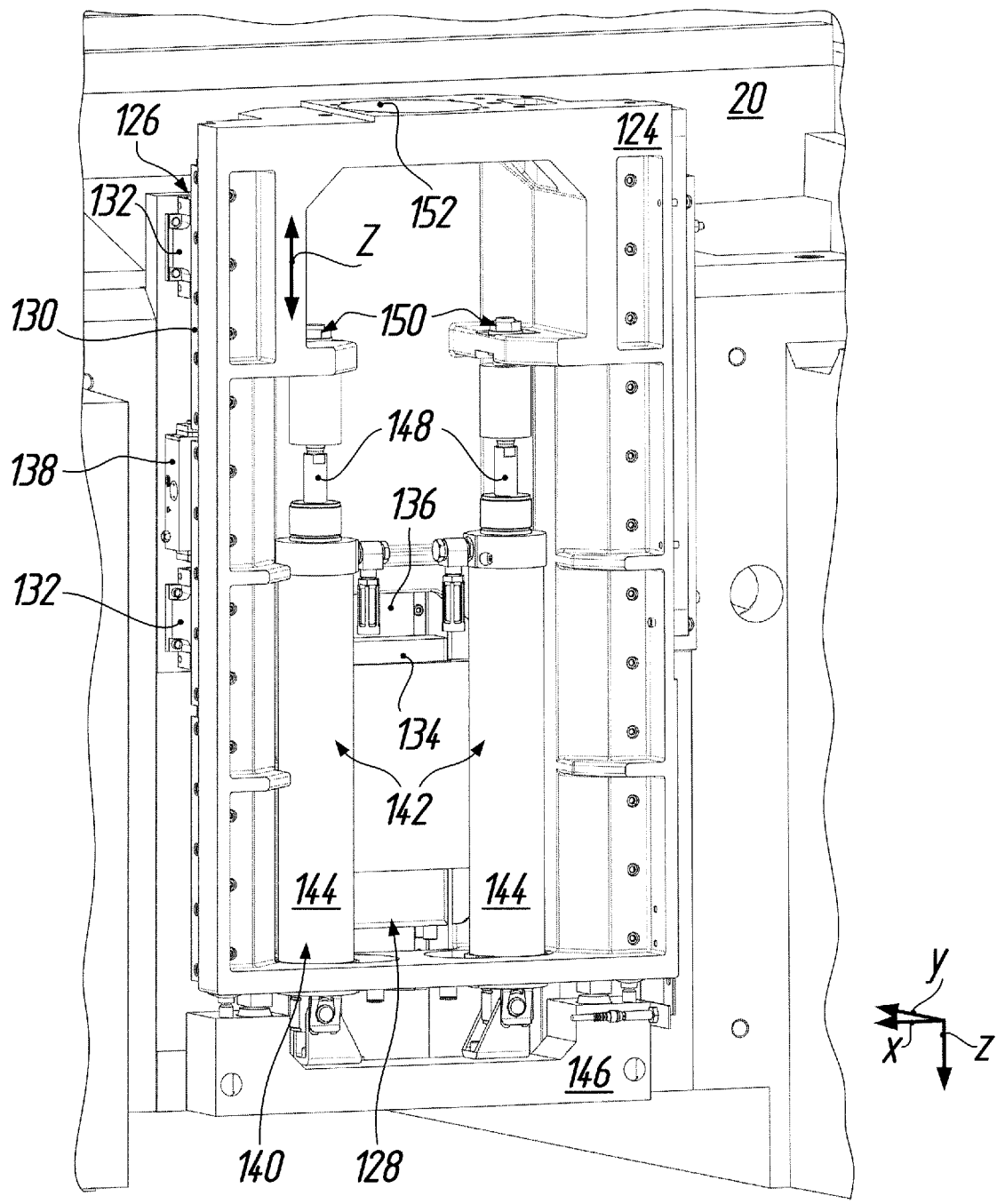
FIG. 10 shows a broken-away perspective view of the grinding and polishing machine according to FIG. 1 obliquely from above and front left with a view of the Z slide, from which the workpiece spindle has been removed so that a guide arrangement for the Z slide and a device for weight compensation for the Z slide can be better seen.

According to, in particular, FIGS. 1 and 10 the guide arrangement 126 comprises two guide rails 130 which extend parallel to one another in the vertical height direction z and which are mounted on the side of the Z slide 124 facing the machine bed 20. A total of four guide carriages 132, in which the guide rails 130 run, is fastened to the front side of the machine 10. The Z slide 124 is adjustable under CNC positional regulation in both directions of the linear axis Z, the linear motor 128 being provided for that purpose. The linear motor 128 has a current-conducting primary part 134 which is mounted on the Z slide 124 between the guide rails 130 and which co-operates with a passive secondary part 136 mounted on the front side of the machine bed 20. The use of the linear motor 128 for the Z slide 124 advantageously makes possible performance of a force-regulated grinding process such as described in document U.S. Pat. No. 9,278,421, which is hereby incorporated by reference with regard to method details.

As further apparent from FIGS. 1, 3, 4 and 10, the guide arrangement 126 for the Z slide 124 comprises clamping elements 138 which serve the purpose of fixing the Z slide 124 relative to the machine bed 20 against the effect of gravitational force. In that regard, associated with each guide rail 130 is a clamping element 138 which is respectively fastened between the corresponding guide carriages 132 at the machine bed 20. The clamping elements 138 have clamping and braking shoes (not shown) which have a geometry complementary with the geometry of the guide rails 130 and are biased by way of a spring energy store (not illustrated) so that in the rest state they are pressed against the guide rail 130 and produce a friction couple therewith.

Each clamping element 138 additionally has a pneumatic piston/cylinder arrangement (not shown) which in the case of pneumatic pressure loading acts against the spring energy store in order to release the clamping and braking shoes so that the respective guide rail 130 is displaceable in the associated clamping element 138. Clamping elements 138 of that kind are commercially available from, for example, the Zimmer group, Rheinau, Germany under the series designation "UBPS".

In addition, the machine 10 is equipped with a device 140 for weight compensation for the Z slide 124 carrying the workpiece spindle 12. In the illustrated embodiment, the device 140 for weight compensation comprises two pneumatic cylinders 142 which are arranged in parallel in the Z slide 124 and which are disposed between the Z slide 124 and the machine bed 20 to be effective in terms of actuation and can be acted on pneumatically to counter the weight of the Z slide 124 carrying the workpiece spindle 12. More precisely, the pneumatic cylinders 142 according to FIG. 10 are articulated by the cylinder housings 144 thereof below the Z slide 124 to a crossbeam 146, which in turn is fixedly mounted on the machine bed 20. Piston rods 148 are fastened at 150 to the Z slide 124 above the cylinder housing 144 to project from this, as can be best seen in FIGS. 3 and 10. It will be evident that the pneumatic cylinders 142 are capable of supporting the weight force of the Z slide 124 by way of the piston rods 148 and the cylinder housing 144 at the crossbeam 146 fixedly connected with the machine bed 20.

Finally, the workpiece spindle 12 is received and fastened in suitable manner in an associated cut-out 152 (see FIG. 10) of the Z slide 124 so that it protrudes above the Z slide 124 upwardly in the direction of the pivot head 14. In the illustrated embodiment, the workpiece spindle 12 carries at its upper end a multi-purpose chuck 154 which can be rotated by the workpiece spindle 12 about the workpiece rotational axis C under CNC rotational angle regulation or turned into defined angular positions. The multi-purpose chuck 154 comprises a hydraulic expansion chucking mechanism (not illustrated), which holds a collet chuck 156 for the cylindrical workpieces L, as shown in, in particular, FIGS. 11 to 14, or a cement adapter 158 when non-cylindrical workpieces (for example aspheres, cylindrical lenses or prisms), as illustrated in FIGS. 15 to 18, are to be held.

Figure 11:
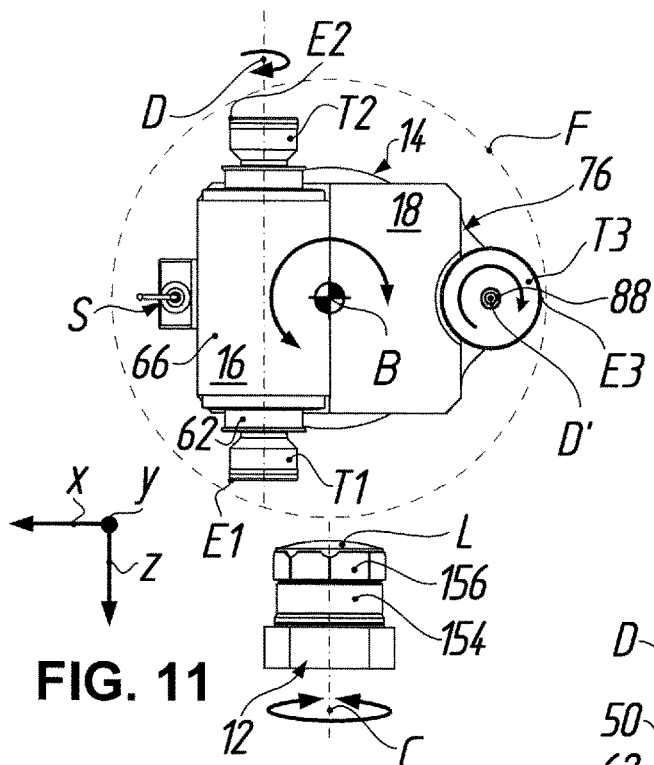
FIG. 11 shows a schematic front view of the pivot head, which carries the tool spindles, of the grinding and polishing machine according to FIG. 1 vis-à-vis the upper end of the workpiece spindle, at which a workpiece to be processed is held by a chuck, wherein a radially outer circular locus of the pivot head is depicted by a dashed line.
Figure 3:
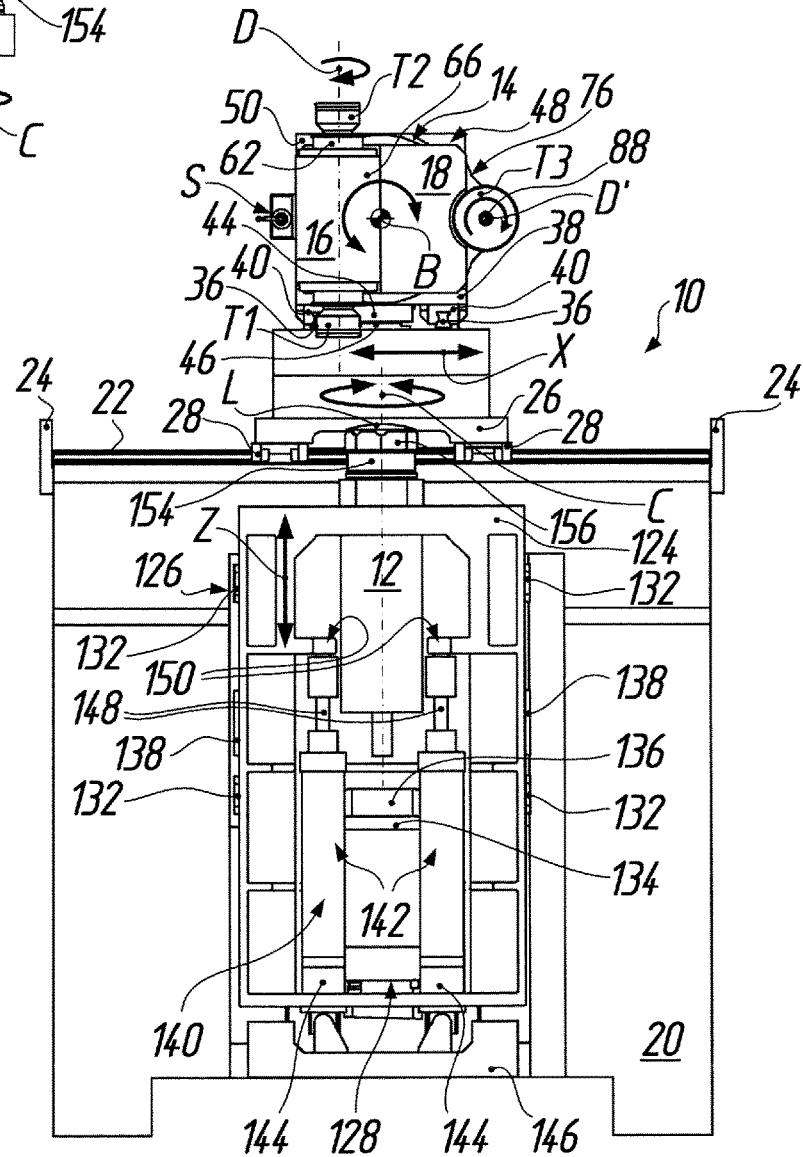
FIG. 3 shows a front view of the grinding and polishing machine according to FIG. 1, with the simplifications of FIG. 1.
Figure 4:
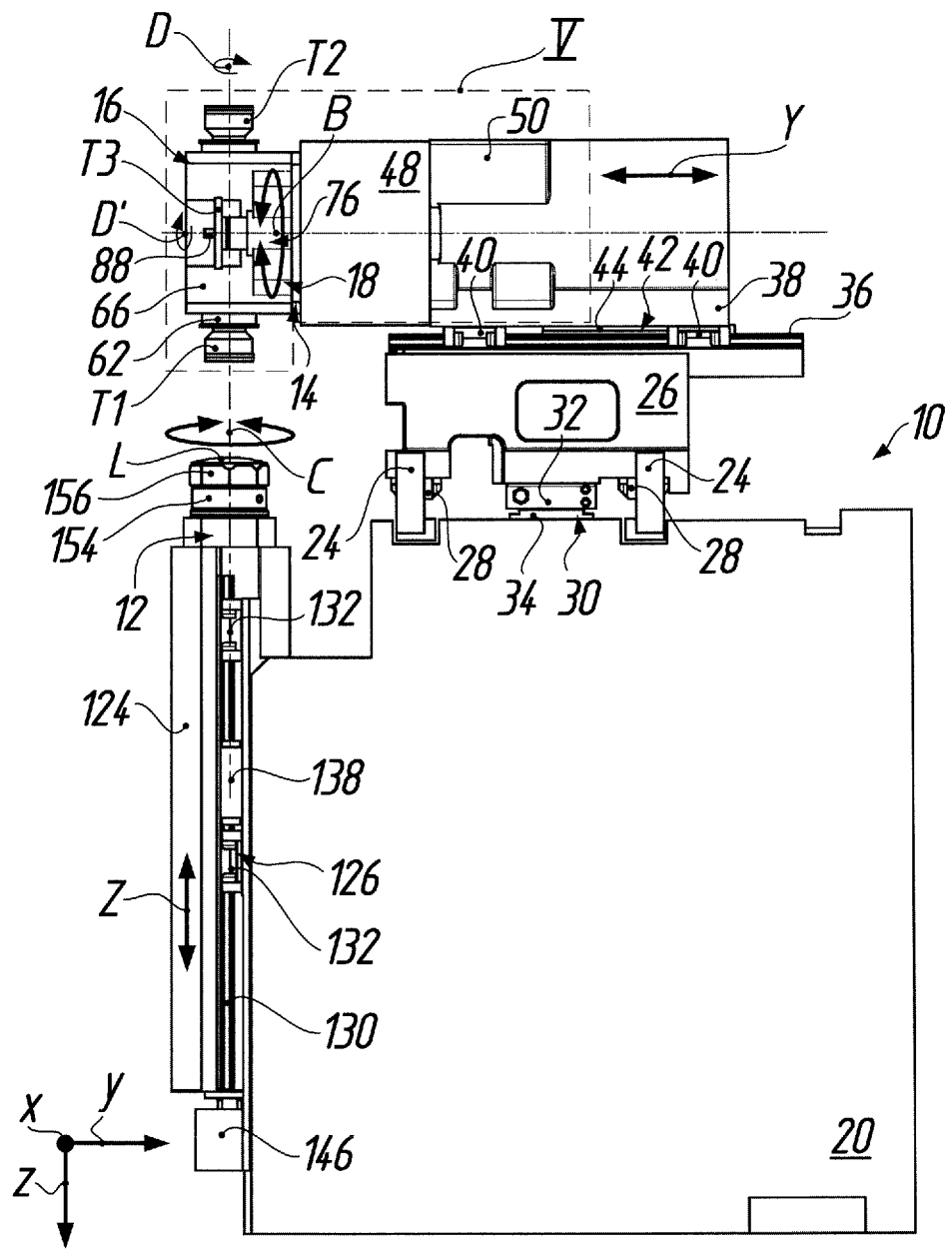
FIG. 4 shows a side view of the grinding and polishing machine according to FIG. 1 from the right in FIG. 3, with the simplifications of FIG. 1.

According to FIG. 11, each processing tool T1, T2, T3 provided at the pivot head 14 has an engagement region E1, E2, E3 which can be brought into processing engagement with the workpiece L. In that case the tool spindles 16, 18 are so arranged on the pivot head 14 that the engagement region of at least one of the processing tools held thereat defines a radially outer circular locus F of the pivot head 14 about the pivot axis B. In other words, no part of the pivot head 14 radially protrudes beyond this circular locus F of the pivot head 14.

In the embodiment illustrated here, even the engagement regions E1, E2, E3 of all processing tools T1, T2, T3 have substantially the same radial spacing from the pivot axis B. Moreover, the engagement regions E1, E2, E3 of the processing tools T1, T2, T3 are substantially uniformly angularly spaced from one another with respect to the pivot axis B, namely by approximately 120°.

FIG. 11 also shows that the pivot head 14 can be laterally provided with a functional element for detecting the workpiece geometry, which is here a measuring scanner S. The measuring scanner S also does not project beyond the circular locus F of the processing tools T1, T2, T3. Instead of the measuring scanner S, an annular spherometer according to DIN 58724 (not shown) as functional element could also be laterally mounted on the pivot head 14.

FIGS. 12 to 16 illustrate in mode and manner similar to FIG. 11 different processing or measuring procedures which can be performed (inter alia) by the machine 10, wherein the pivot head 14 with the tool spindles 16, 18 and the workpiece spindle 12 are illustrated in each instance in a schematic front view.

Figure 12:
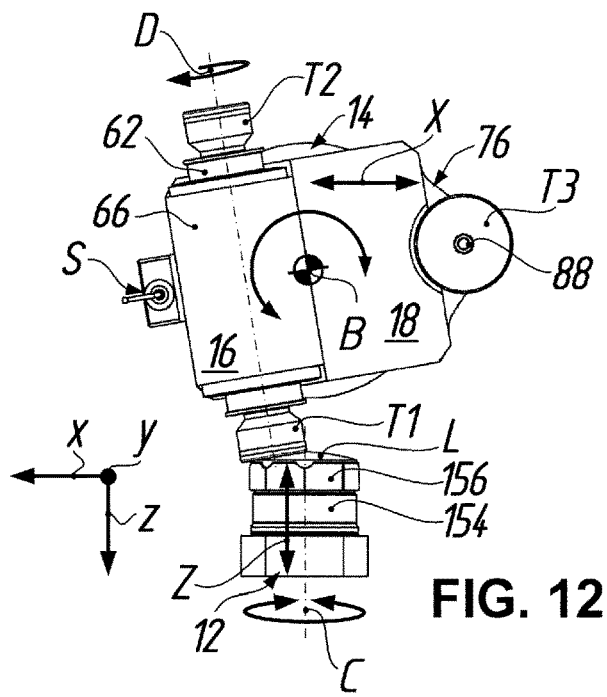
FIGS. 12 to 16 show schematic front views, which are similar to FIG. 11, of the pivot head and workpiece spindle of the grinding and polishing machine according to FIG. 1, which illustrate different processing or measuring procedures, wherein in FIGS. 15 and 16 a larger workpiece is held by a cement adapter at the upper end of the workpiece spindle.

FIG. 12 shows how initially the convex surface of a lens L is processed by the lower cup wheel T1 mounted on the lefthand tool spindle 16. The processing corresponds with the known area-grinding principle. Whereas the lens L held in the collet chuck 156 is driven by the workpiece spindle 12 for rotation about the workpiece rotational axis C, the tool spindle 16 drives the cup wheel T1 for rotation about the tool rotational axis D. The pivot head 14 is pivoted about the pivot axis B into a predetermined angular setting which does not further change during this processing step. Subsequently, adjustment and feed take place by coordinated movement of the workpiece spindle 12 along the linear axis Z (adjustment) and the pivot head 14 along the linear axis X (feed).

When this processing step e.g., preliminary processing of the lens L, has ended, the pivot head 14 can be pivoted, for example for the purpose of precision processing of the lens L, until the cup wheel T2 held at the other end of the tool spindle 16 is opposite the workpiece spindle 12 (not shown), whereupon in analogous manner the rotating lens L is processed by the similarly rotating cup wheel T2 (fixed pivot angle about the pivot axis B, adjustment along the linear axis Z and feed along the linear axis X).

Figure 13:
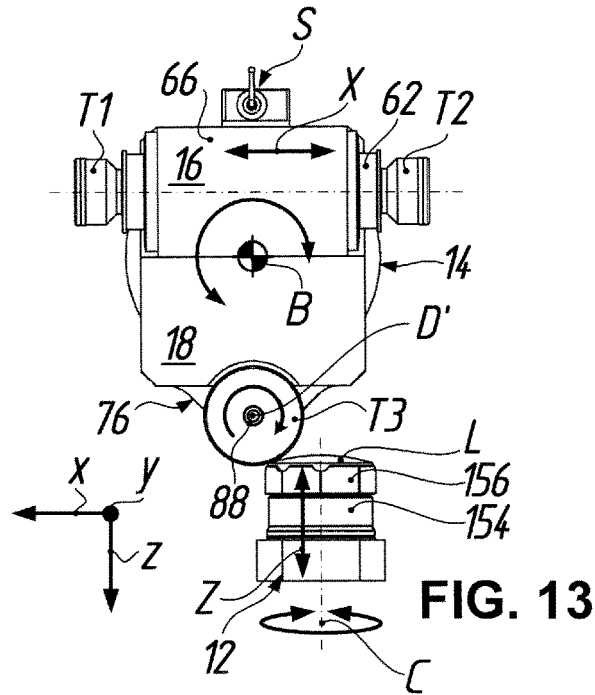

An ultra-precision processing step carried out by the circumferential grinding wheel T3, which is mounted on the tool spindle 18 oriented in parallel to the pivot axis B, corresponding with the respective processing requirements can then follow that. This is illustrated in FIG. 13. For that purpose, the tool spindle 18 is pivoted by the pivot head 14 about the pivot axis B into a position in which the circumferential grinding wheel T3 is opposite the workpiece spindle 12. The tool T3 and workpiece L are then rotationally driven and brought into a defined processing engagement by coordinated movement in the pivot axis B, the linear axis X and the linear axis Z. This processing step is of great interest particularly for surfaces which are not rotationally symmetrical or for free-shape surfaces.

It will be apparent that no tool change and also no tool re-adjustment are needed for the afore-described processing sequence, since the required tools T1, T2 and T3 are already all present at the pivot head 14.

Figure 14:
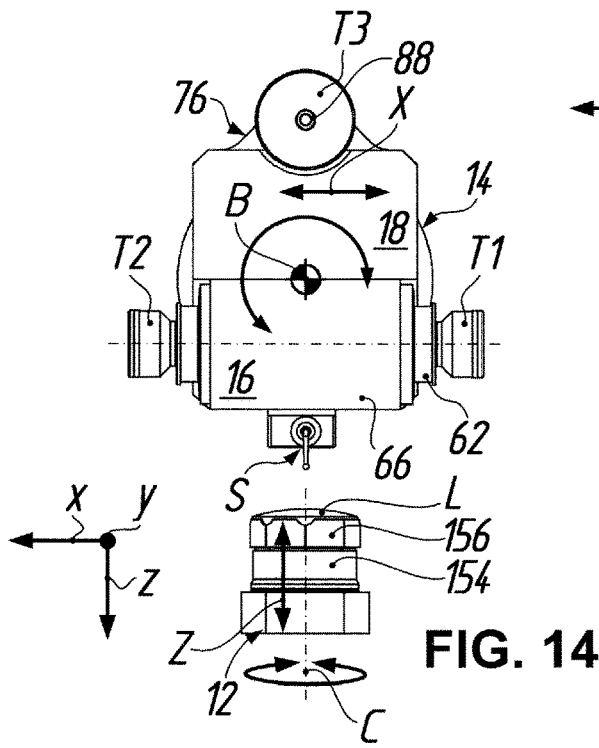

In FIG. 14 it is illustrated how the measuring scanner S laterally mounted on the pivot head 14 is used in order to measure, for example, the center thickness of the lens L. Initially, alignment of the measuring scanner S with the workpiece rotational axis C takes place with the assistance of the movement axes B, X and optionally Y, before the actual scanning of the lens L with use of the movement axis Z takes place. Equally, the measuring scanner S in a predetermined angular position about the pivot axis B can be employed—with suitable use of the movement axes X, Z, C or Y—for the purpose of detecting the entire geometry of the lens L. The measurement values can then be directly read into the CNC control so as to carry out, for example, automatic corrections and wear compensation.

Figure 15:
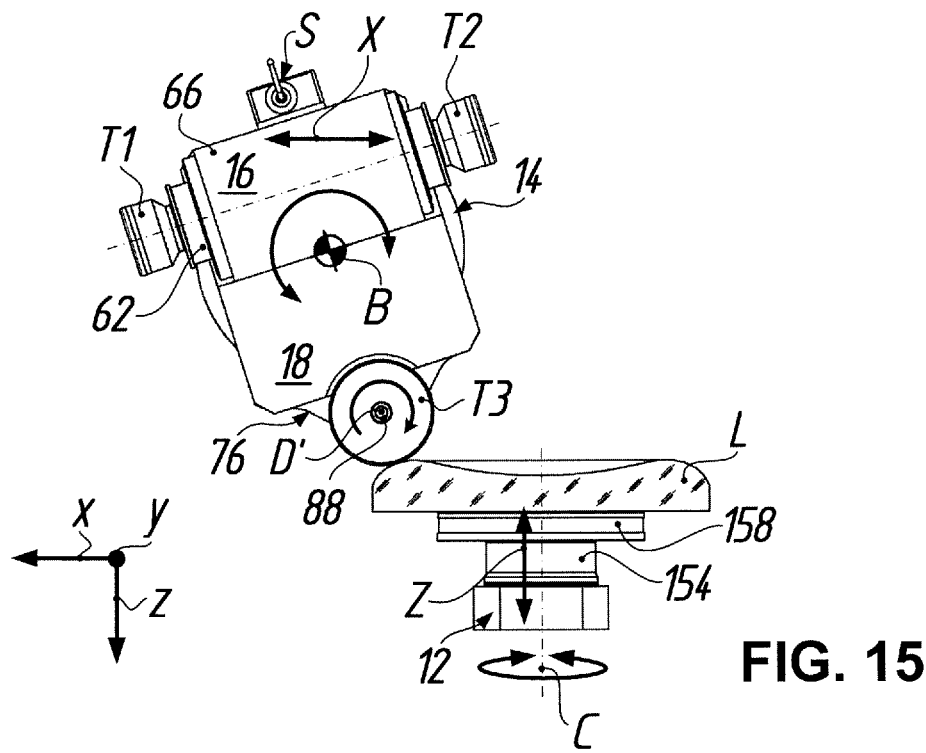

FIG. 15 illustrates processing of a large aspherical workpiece L, which is cemented on the cement adapter 158, which in turn is held at the multi-purpose chuck 154 of the workpiece spindle 12. This processing can be carried out in accordance with the rotational circumferential transverse grinding principle or longitudinal grinding principle, wherein the workpiece surface can be processed either spirally (with use of the workpiece rotational axis C) or in meandering manner (with use of the linear axis Y). The lengthy travel paths of the pivot head along the linear axis X and the large pivot angle of the pivot head 14 about the pivot axis B are of particular advantage for this form of processing.

Figure 16:
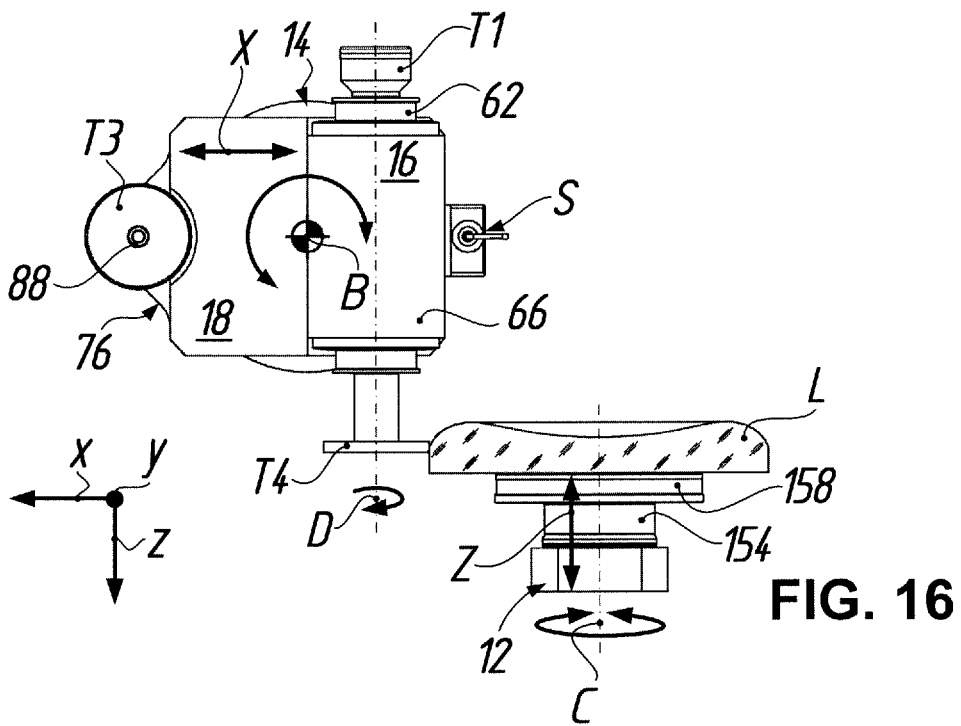

FIG. 16 shows edge processing of the workpiece L of FIG. 15 by use of a circumferential grinding wheel T4 held at an end of the tool spindle 16. This processing can be carried out at a fixed pivot angle of the pivot head 14 about the pivot axis B (0°, as shown) and a suitable travel in the movement axes X and Z (cylinder centering). For application of a key surface to the outer circumference of the workpiece L, i.e. for generating a flat at one (or more) side(s) of the workpiece L, a suitably coordinated travel in the movement axes X, Z and C (large workpieces) or X, Z and Y (small workpieces) can also be carried out.

Figure 17:
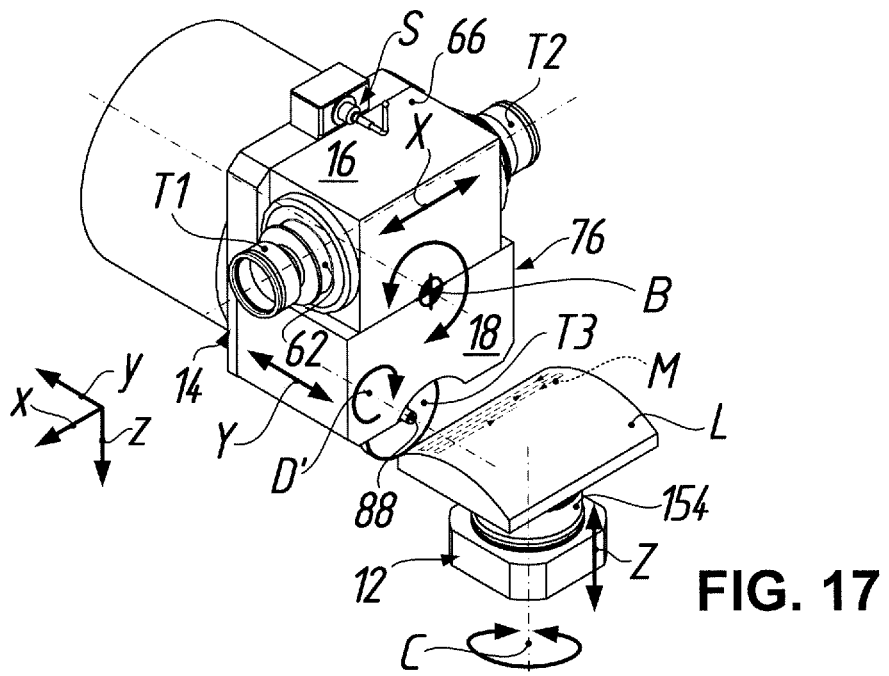
FIGS. 17 and 18 show schematic perspective views of the pivot head and workpiece spindle of the grinding and polishing machine according to FIG. 1 obliquely from above and front left, which illustrate further processing procedures at the workpieces, which are held by a cement adapter at the upper end of the workpiece spindle.

In the processing example of FIG. 17, a cylinder lens L is processed by use of a circumferential grinding wheel T3 held at the tool spindle 18. This processing takes place at a fixed pivot angle of the pivot head 14 about the pivot axis B and workpiece L fixedly positioned with respect to the workpiece rotational axis C. The adjustment takes place in the movement axis Z, whereas through suitable coordinated movement in the movement axes X and Y the workpiece surface to be processed is moved away in raster-like ("meshing") or in meander-like manner from the tool T3. A meander-like processing track is denoted in FIG. 17 by M.

Figure 18:
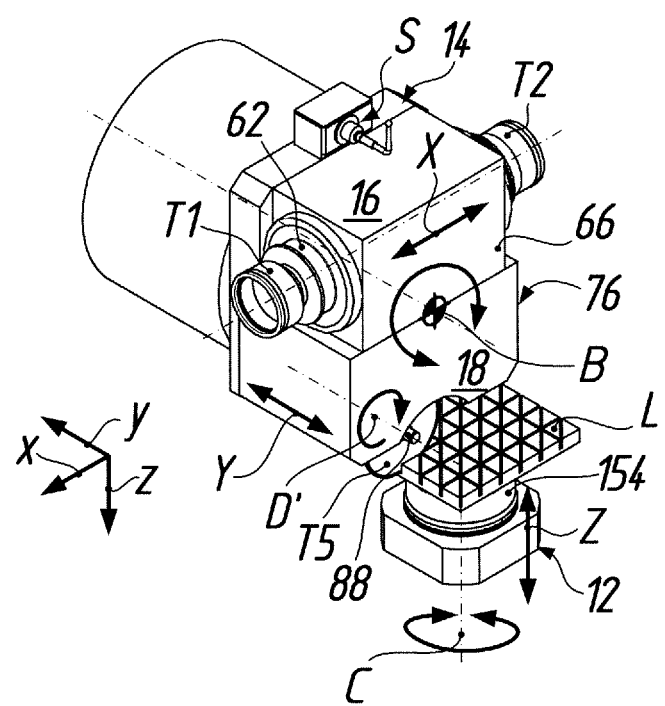

FIG. 18 illustrates the sawing or separation of a workpiece L by use of a very narrow separating grinding wheel T5, which is held at the tool spindle 18. The feed takes place here at fixed pivot angles in the movement axes B and C by relative motion along the linear axis X, and the adjustment by relative motion along the linear axis Z. In addition, raster-like or meandering processing can be carried out here by suitable movement along the linear axis Y between the individual steps. Thus, for example, prisms can be produced.

Figure 19:
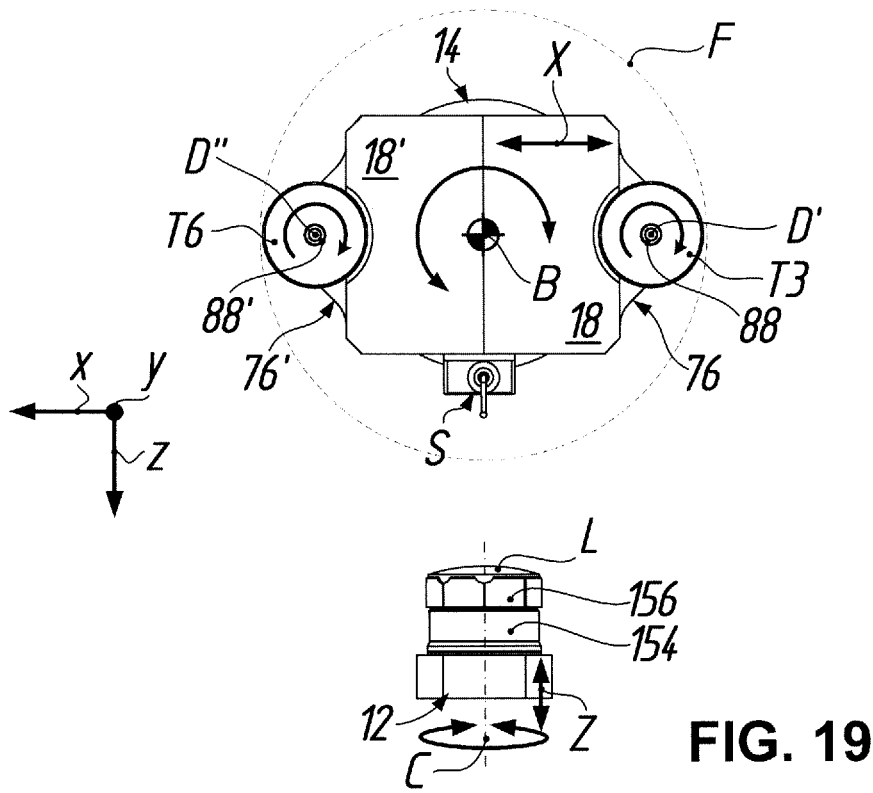
FIG. 19 shows a schematic front view, which corresponds with respect to the form of illustration of FIG. 11, of a pivot head according to a second embodiment, which carries two tool spindles according to FIGS. 6 to 9 with tool rotational axes D', D" parallel to the pivot axis B, vis-à-vis the upper end of the workpiece spindle of the grinding and polishing machine according to FIG. 1.
Figure 20:
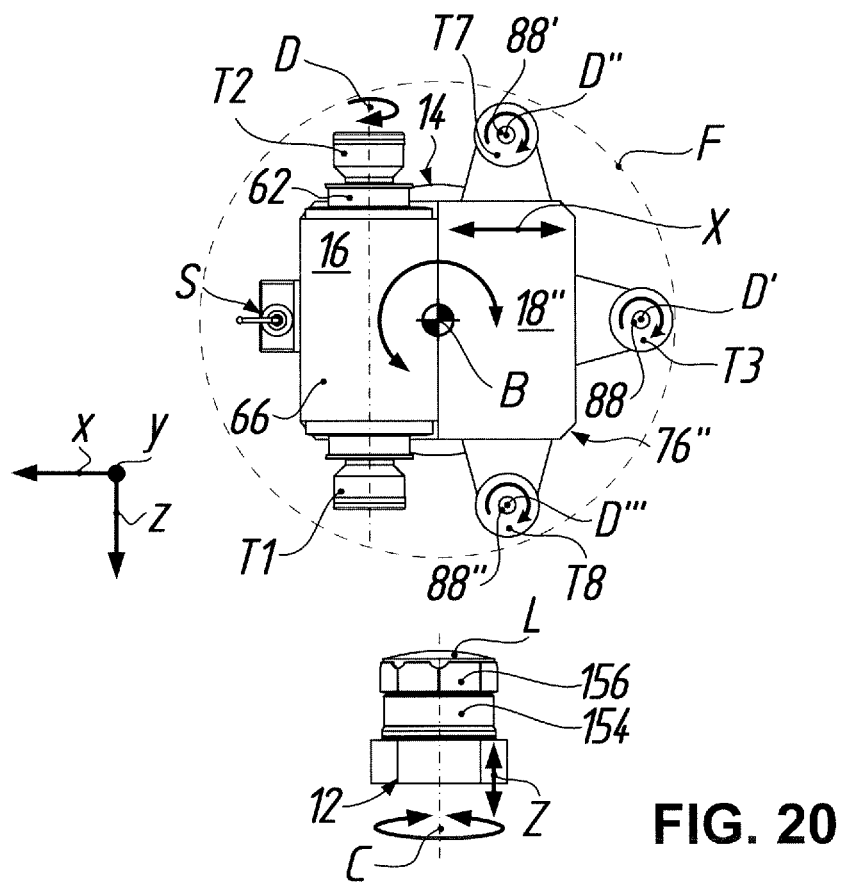
FIG. 20 shows a schematic front view, which corresponds with respect to the form of illustration of FIG. 11, of a pivot head according to a third embodiment, which—analogously to the pivot head shown in FIG. 1 in accordance with a first embodiment—carries a first tool spindle extending by its tool axis D of rotation transversely to the pivot axis B, but which is additionally provided with three tool spindles extending parallel to the pivot axis, vis-à-vis the upper end of the workpiece spindle of the grinding and polishing machine according to FIG. 1.

FIGS. 19 and 20 show further embodiments of the pivot head 14. In the second embodiment of the pivot head 14 according to FIG. 19 two tool spindles 18, 18' according to FIGS. 6 to 9 with tool rotational axes D, D" parallel to the pivot axis B are mounted on the pivot head 14 in mirror-symmetrical arrangement. The pivot head 14 can thus be provided on sides, which are diametrically opposite with respect to the pivot axis B, with, for example, respective circumferential grinding wheels T3, T6. In this way processing can similarly be in two stages with, for example, two different tool granulations, so that preliminary processing and precision processing can be carried out without a tool change.

Finally, FIG. 20 shows a third embodiment of the pivot head 14 and in general the possibility of using several grinding or polishing tools T1, T2, T3, T7 and T8, which correspond with the respective processing requirements, in the proposed arrangement on the one hand rotating transversely with respect to the pivot axis B (tool rotational axis D) and for the other hand rotating parallel to the pivot axis B (tool rotational axes D', D", D''') as well as lying in the machine 10 substantially on a circular locus F.

A machine for processing workpieces in optical quality comprises at least one workpiece spindle, by way of which a workpiece to be processed is drivable for rotation about an workpiece rotational axis C, and additionally has a pivot head, which is opposite the workpiece spindle and which is pivotable about a pivot axis B and carries at least two tool spindles, at each of which at least one processing tool is held to be drivable for rotation about a tool rotational axis D, D'. In addition, the workpiece spindle and the pivot head are adjustable relative to one another along three mutually perpendicular linear axes X, Y, Z, of which one linear axis Y extends parallel to the pivot axis B and another linear axis Z extends parallel to the workpiece rotational axis C. At least one tool spindle is mounted at the pivot head with its tool rotational axis D' extending parallel to the pivot axis B, which allows a multiplicity of different processing strategies, particularly also the processing of large workpieces and workpieces with large changes in topography with a high level of accuracy.

Variations and modifications are possible without departing from the scope and spirit of the present invention as defined by the appended claims.

We claim:

1. A machine (10) for processing optically effective surfaces of workpieces, comprising:
   at least one workpiece spindle (12), which rotatably drives a workpiece (L) to be processed about an axis (C) of workpiece rotation, and
   a pivot head (14), which is opposite the at least one workpiece spindle (12) and which is pivotable about a pivot axis (B) and carries at least two tool spindles (16, 18), each of which rotatably drives a respective processing tool (T1, T2, T3) for rotation about an axis (D, D') of tool rotation,
   wherein the at least one workpiece spindle (12) and the pivot head (14) are adjustable relative to one another along three mutually perpendicular linear axes (X, Y, Z) of which one linear axis (Y) extends parallel to the pivot axis (B), and
   wherein the axis (C) of workpiece rotation extends parallel to another linear axis (Z) of the linear axes (X, Y, Z),
   characterized in that at least one tool spindle (18) of the at least two tool spindles (16, 18) is mounted at the pivot head (14), the (D) of tool rotation of the at least one tool spindle (18) of the at least two tool spindles (16, 18) extends parallel to the pivot axis (B),
   whereas at least one other tool spindle (16) of the at least two tool spindles (16, 18) is mounted at the pivot head (14), the axis (D") of tool rotation of the at least one other tool spindle (16) of the at least two tool spindles (16, 18) extends transversely or parallel to said axis (D) of tool rotation of said at least one tool spindle (18) of the at least two tool spindles (16, 18),
   wherein the respective processing tools, held by the at least two tool spindles (16, 18), are fixedly located relative to one another in a same processing plane, which extends transversely to the pivot axis (B), and are configured to be only movable within said same processing plane.

2. A machine (10) according to claim 1, further characterized in that each of the respective processing tools (T1, T2, T3) has an engagement region (E1, E2, E3) which can be brought into processing engagement with the workpiece (L), wherein the at least two tool spindles (16,18) are so arranged at the pivot head (14) that the engagement region (E1, E2, E3) of at least one of the processing tools (T1, T2, T3) held thereat defines a radially outer circular locus (F) of the pivot head (14) about the pivot axis (B).

3. A machine (10) according to claim 2, further characterized in that the engagement regions (E1, E2, E3) of the respective processing tools (T1, T2, T3) are substantially uniformly angularly spaced from one another with respect to the pivot axis (B).

4. A machine (10) according to claim 2, further characterized in that the engagement regions (E1, E2, E3) of all of the respective processing tools (T1, T2, T3) have substantially the same radial spacing from the pivot axis (B).

5. A machine (10) according to claim 4, further characterized in that the engagement regions (E1, E2, E3) of the respective processing tools (T1, T2, T3) are substantially uniformly angularly spaced from one another with respect to the pivot axis (B).

6. A machine (10) according to claim 5, further characterized in that said at least one other tool spindle (16), of the at least two tool spindles (16,18), is mounted on the pivot head (14) wherein the axis (D) of tool rotation of the at least one other tool spindle (16) of the at least two tool spindles (16, 18) extends transversely to the pivot axis (B).

7. A machine (10) according to claim 6, further characterized in that said at least one other tool spindle (16), of the at least two tool spindles (16,18), with the axis (D) of tool rotation extending transversely to the pivot axis (B), is constructed at both ends for coaxial mounting of a respective processing tool (T1, T2).

8. A machine (10) according to claim 7, further characterized in that a center of mass of the pivot head (14) carrying the at least two tool spindles (16,18) lies on or near the pivot axis (B).

9. A machine (10) according to claim 1, further characterized in that a belt drive (96) is provided for rotary drive of said at least one tool spindle (18) which has the axis (D') of tool rotation that extends parallel to the pivot axis (B), the belt drive comprising a spindle motor (98) which is arranged parallel to a spindle shaft (88) of said at least one tool spindle (18), and is in drive connection with the spindle shaft (88) by way of a belt (100).

10. A machine (10) according to claim 9, further characterized in that the spindle motor (98) is pivotably mounted relative to the spindle shaft (88) for tensioning the belt (100).

11. A machine (10) according to claim 10, further characterized in that the belt (100) is a poly-V belt.

12. A machine (10) according to claim 11, further characterized in that the at least one workpiece spindle (12) is mounted on a Z slide (124) for adjustment along the linear axis (Z) that extends parallel to the axis (C) of workpiece rotation, the Z slide (124) being guided at a machine bed (20) by use of a guide arrangement (126) and being movable by use of a linear motor (128) relative to the machine bed (20).

13. A machine (10) according to claim 12, further characterized in that the Z slide (124) is fixable relative to the machine bed (20) by clamping elements (138) provided at the guide arrangement (126).

14. A machine (10) according to claim 13, further characterized by a device (140) for weight compensation for the Z slide (124) carrying the at least one workpiece spindle (12).

15. A machine (10) according to claim 14, further characterized in that the device (140) for weight compensation comprises at least one pneumatic cylinder (142) which is arranged between the Z slide (124) and the machine bed (20), and can be acted on pneumatically so as to counter the weight of the Z slide (124) carrying the at least one workpiece spindle (12).

16. A machine (10) according to claim 15, further characterized in that the pivot head (14) is provided with a functional element (S) for detecting the workpiece geometry.

17. A machine (10) according to claim 1, further characterized in that said at least one other tool spindle (16), of the at least two tool spindles (16, 18), is mounted on the pivot head (14) wherein the axis (D) of tool rotation of the at least one other tool spindle (16) of the at least two tool spindles (16, 18) extends transversely to the pivot axis (B).

18. A machine (10) according to claim 17, further characterized in that said at least one other tool spindle (16) of the at least two tool spindles (16,18), with the axis (D) of tool rotation extending transversely to the pivot axis (B), is constructed at both ends for coaxial mounting of a respective processing tool (T1, T2).

19. A machine (10) according to claim 1, further characterized in that a center of mass of the pivot head (14) carrying the at least two tool spindles (16, 18) lies on or near the pivot axis (B).

20. A machine (10) according to claim 1, further characterized in that a belt drive (96) is provided for rotary drive of said at least one tool spindle (18) which has the axis (D') of tool rotation that extends parallel to the pivot axis (B), the belt drive comprising a spindle motor (98) which is arranged parallel to a spindle shaft (88) of said at least one tool spindle (18), and is in drive connection with the spindle shaft (88) by way of a belt (100).

21. A machine (10) according to claim 20, further characterized in that the spindle motor (98) is pivotably mounted relative to the spindle shaft (88) for tensioning the belt (100).

22. A machine (10) according to claim 20, further characterized in that the belt (100) is a poly-V belt.

23. A machine (10) according to claim 1, further characterized in that the at least one workpiece spindle (12) is mounted on a Z slide (124) for adjustment along the linear axis (Z) that extends parallel to the axis (C) of workpiece rotation, the Z slide (124) being guided at a machine bed (20) by use of a guide arrangement (126) and being movable by use of a linear motor (128) relative to the machine bed (20).

24. A machine (10) according to claim 23, further characterized in that the Z slide (124) is fixable relative to the machine bed (20) by clamping elements (138) provided at the guide arrangement (126).

25. A machine (10) according to claim 23, further characterized by a device (140) for weight compensation for the Z slide (124) carrying the at least one workpiece spindle (12).

26. A machine (10) according to claim 25, further characterized in that the device (140) for weight compensation comprises at least one pneumatic cylinder (142) which is arranged between the Z slide (124) and the machine bed (20), and can be acted on pneumatically so as to counter the weight of the Z slide (124) carrying the at least one workpiece spindle (12).

27. A machine (10) according to claim 1, further characterized in that the pivot head (14) is provided with a functional element (S) for detecting the workpiece geometry.

* * * * *